(12) United States Patent
Pierret et al.

(10) Patent No.: US 6,480,803 B1
(45) Date of Patent: Nov. 12, 2002

(54) LOAD SHEDDING THERMOSTAT

(75) Inventors: Peter Gerard Pierret, Fayetteville, NY (US); Kevin Farrell Dudley, Cazenovia, NY (US)

(73) Assignee: Carrier Corporation, Farmington, CT (US)

( * ) Notice: Subject to any disclaimer, the term of this patent is extended or adjusted under 35 U.S.C. 154(b) by 61 days.

(21) Appl. No.: 09/747,641

(22) Filed: Dec. 22, 2000

(51) Int. Cl.[7] .............................................. G06F 15/00
(52) U.S. Cl. .......................................... 702/130; 307/39
(58) Field of Search ......................... 307/39; 236/46 R; 364/557, 152; 702/130

(56) References Cited

U.S. PATENT DOCUMENTS

| 4,228,511 A | | 10/1980 | Simcoe et al. | |
|---|---|---|---|---|
| 4,341,345 A | * | 7/1982 | Hammer et al. | 236/46 R |
| 4,345,162 A | * | 8/1982 | Hammer et al. | 307/39 |
| 4,655,279 A | | 4/1987 | Harmon, Jr. | |
| 5,644,173 A | | 7/1997 | Elliason et al. | |
| 5,717,609 A | * | 2/1998 | Packa et al. | 364/557 |

* cited by examiner

Primary Examiner—John S. Hilten
Assistant Examiner—Xiuqin Sun
(74) Attorney, Agent, or Firm—Wall Marjama & Bilinski LLP

(57) ABSTRACT

A method of load shedding wherein a series of load shedding thermostats are mounted in building serviced by a utility. Each thermostat contains an addressable processor arranged to receive different code inputs form the utility. Heat loss and load characteristics for buildings are calculated from measured indoor and outdoor temperature movements along with the equipment's duty cycle for a given period of time and the required setback temperature for a given coded input is set into the thermostat based upon heat loss and load characteristics of the building.

9 Claims, 5 Drawing Sheets

LOAD SHEDDING THERMOSTAT

FIELD OF THE INVENTION

This invention relates generally to a thermostat control, and specifically to a method of conserving energy when the heating or cooling demands on a utility reaches a relatively high peak level.

BACKGROUND OF THE INVENTION

The increasing demand for electrical energy oftentimes produces an overload condition upon many utilities, particularly during periods of extreme temperatures when the consumers are calling for high levels of energy to satisfy their heating and cooling needs. Currently, some utilities are employing a load shedding system to reduce the power demands during peak power consumption periods. When the customers' demand for energy reaches a given high level, a utility company that utilizes a load shedding program will send a message to specially equipped thermostats located in specific consumer facilities instructing the thermostat to adjust the preset temperature setting by a fixed number of degrees to reduce the power consumption, and thus the load upon the utility during a given period of time when the demand is expected to be exceptionally high.

The intended reduction in demand, however, may not necessarily be accomplished by many of these prior art systems for a number of reasons. First, a fixed amount of set point adjustment will usually result in a different amount of load shedding in each of the buildings that are being serviced due to differences in building construction and the type and size of the heating and cooling equipment utilized in the structures. Second, the thermostat setting within many of the buildings may be at some extreme set point at the time of a load shedding period. The set back adjustment will thus have little or no effect and the heating or cooling equipment will run continuously during the load shedding period. For example, if a cooling system is set at 70° F. on a day when the outside temperature is 100° F., setting the thermostat to 72° F. will have no effect and the equipment will continue to run throughout the peak demand period without satisfying the demand of the thermostat. Lastly, many buildings are now equipped with programmable thermostats that might be in a setback mode at the time a shedding period is commenced. Typically, the setback mode is utilized when the occupants of a dwelling are at work and the dwelling is unoccupied. When a load shedding instruction is received by the thermostat when it is in an "unoccupied" mode setting, the thermostat will, in many cases, automatically go into a preprogrammed "occupied" mode setting during the load shedding period thereby increasing the load demand rather than reducing it during the shedding period.

SUMMARY OF THE INVENTION

It is therefore an object of the present invention to conserve energy.

It is a further object of the present invention to reduce the amount of energy consumed by equipment used to heat and/or cool buildings, particularly during periods when peak power is in demand.

A still further object of the present invention is to provide a system for load shedding that takes into consideration factors involving a structure's heat loss and other load related characteristics.

Another object of the present invention is to preprogram a thermostat with load shedding data so that the thermostat can respond to a coded input to reduce power consumption as a function of the indoor and outdoor temperatures as well as the building's heat loss and load characteristics.

Yet a still further object of the present invention is to precondition the heating and cooling system of a building in advance of a load shedding period to allow the building to store energy prior to the period and thus help reduce the load demand during the load shedding period.

Still another object of the present invention is to reset thermostats that have previously setback during a load shedding period so as to minimize the impact of the recovery.

These and other objects of the present invention are attained by a load shedding thermostat having a processor for received coded input signals from an energy provider. When energy demands are predicted to be exceptionally high, one or more input signals are sent to the thermostat to adjust the temperature setting to an energy saving level. The adjusted setting, unlike other setback thermostats, is not a fixed value, but rather is based upon normal heating or cooling operations determined prior to the initiation of a load shedding period. The adjusted load shedding settings take into consideration indoor and outdoor temperatures and factors involving the building's heat loss and load characteristics.

BRIEF DESCRIPTION OF THE DRAWING

For a better understanding of these and other objects of the present invention, reference will be made to the following detailed description of the invention which is to be read in connection with the accompanying drawing, wherein.

DETAILED DESCRIPTION OF THE INVENTION

Figure 1:
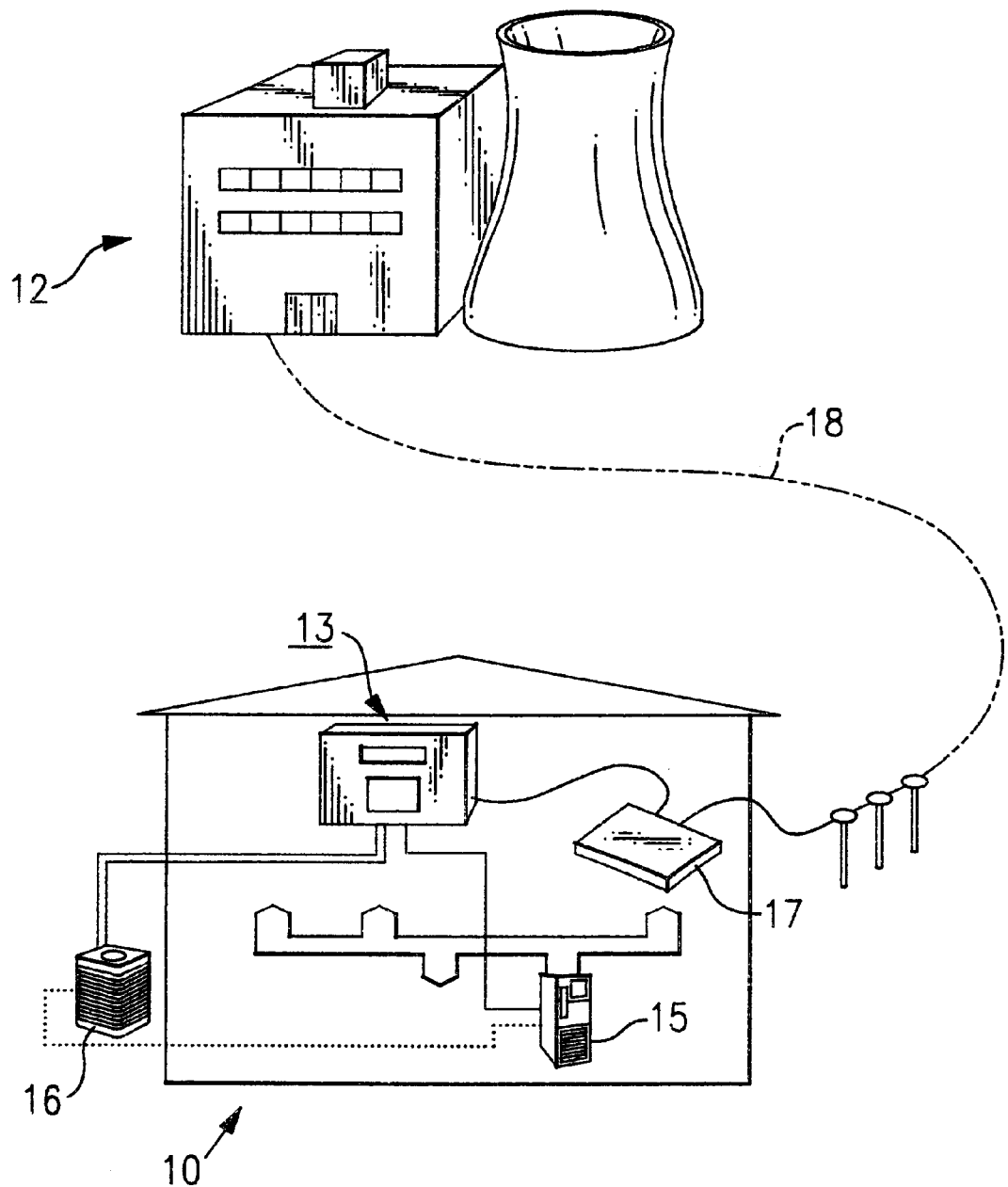
FIG. 1 is a schematic representation illustrating a load shedding thermostat employed in a home containing heating and cooling equipment.

Referring initially to FIG. 1, there is illustrated schematically a building generally referenced 10, that is serviced by a power generating plant 12 such that as owned and operated by a utility company. It should be understood that the building may be one of many homes and businesses within the utility service area that require energy for both heating and cooling. As should be evident, the construction of these buildings and the heating and cooling equipment utilized in the buildings will sometimes vary rather dramatically. As will be explained in greater detail below, some of the buildings situated within the service region may be equipped with a load shedding thermostat 13 for controlling both heating equipment such as furnace 15 and/or cooling equipment 16 such as air conditioning unit 16. The thermostat is able to communicate with the utility company via a modem 17 and land lines 18. Although land lines, such as phone lines or closed circuit cable lines, may be used in the practice of the invention, wireless communication systems of the type in present day use may also be employed without departing from the spirit of the invention. In practice, the thermostat contains a micro processor for storing and processing data as well as communicating with the utility to control the operation of the heating and cooling equipment contained within the building.

In practice, the utility is able to send one of a series of available code signals to the thermostat relating to the operation of the equipment as well as the reduction of power consumption in the event of an expected power shortage. One primary reason for the occurrence of a power shortage is unseasonable weather conditions which typically result in an exceptionally large demand for power due to lengthy warm or cold periods when the heating or cooling equipment is operated on an almost continuous basis. Oftentimes the power provider can predict when a peak demand will occur under these types of extreme weather conditions, and approximately how long the peak demand might last. The present system takes advantage of this capability to predict a peak load occurrence and operates to store energy within a building prior to the expected peak load demand period and automatically change the thermostat setting to reduce the power consumption by a percentage of that consumed under normal load conditions prior to the peak load demand period.

Table 1 below, by way of example, outlines a series of code input signals that can be sent from a utility to a load shedding thermostat that is employed within a building such as a private home or the like. The code input signals in this example range from 0–7. A zero input signal asks for a normal operating temperature setting and does not require load shedding activities. The term normal operating temperature setting, as herein used, refers to a thermostat set point selected by a building occupant to provide a desired comfort level during a period of normal load conditions. The normal temperature setting may be one selected to cover a period of time during which the building is occupied, which is referred to as an "occupied" temperature setting or an energy saving temperature setting which is selected to cover a period when the building is unoccupied, which is referred to as an "unoccupied" temperature setting.

Code 1 relates to an input that is sent prior to a load shedding event during which time the thermostat setting is adjusted so that indoor temperature is increased during a heat cycle or decreased during a cooling cycle whereby additional energy is stored in the building prior to a load shedding period. This input is utilized by the utility when it can predict the onset of a peak power demand period some time before the occurrence of a load shedding event. The remaining input code signals relate to load shedding periods, each of which demands a certain amount of reduction in energy consumption. As will be explained in greater detail below, the amount of reduction is calculated in terms of a percentage of the normal building load at or close to the time of a load shedding event. Although seven code inputs are employed in this example, it should be clear to one skilled in the art that the number of inputs may be increased or decreased without departing from the teachings of the present invention.

As noted above in the case where a peak power occurrence can be predicted, the utility company will initially issue a code 1 signal which instructs the thermostat to call for additional energy one hour before the load shedding event is to begin. This allows the building to store additional energy during this time when power is available by either precooling or preheating the structure as the case might be. This, of course, helps to reduce the load requirements during the load shedding event and thus make the building more comfortable during the event. In the example shown in Table 1, the thermostat is calling for cooling prior to the event and when it receives a code 1 input it reduces the set point by 2° F. one hour prior to the occurrence of the load shedding event.

TABLE 1

| | LOAD SHED CODES | | | |
|---|---|---|---|---|
| | LOAD SHED | | SETBACK | RECOVERY |
| CODE | | % | (F) (hrs.) | (Hrs) |
| 0 | NONE | 0 | NONE NONE | NONE |
| 1 | PRECONDITION | 0 | −2.0 1.0 | N/A |
| 2 | LOWEST | 3 | 1.0 1.0 | 0.50 |
| 3 | ↓ | 7 | 2.0 2.0 | 1.00 |
| 4 | | 10 | 3.0 3.0 | 1.50 |
| 5 | | 13 | 4.0 4.0 | 2.00 |
| 6 | | 17 | 5.0 5.0 | 2.50 |
| 7 | HIGHEST | 20 | 6.0 6.0 | 3.00 |

After the building has been preconditioned a second code input signal is issued by the utility instructing the thermostat to move the setback to a desired power reduction setting. For example, when a Code 4 input is sent, the thermostat will be set so that a 10% savings in power consumption will be realized. The setback amount is not a fixed amount for any of the code conditions. It is derived as a function of the building's heat loss, and the heating and cooling equipment's operational characteristics which are determined during a period of normal operation. This information is stored in the thermostat prior to the load shedding occurrence and periodically updated to keep the stored data current. The manner by which this information is derived will be explained in greater detail below. For a heating cycle, the normal temperature setting will be reduced, while for a cooling cycle, it will be increased.

The setback hours noted in the last column of Table 1, indicates how long each shedding period will last as determined by the utility. The more severe the load demand, the longer will the shedding period last. A recovery period is also provided for each code during which time the heating or cooling system will be ramped back to its original pre-peak load setting. This helps to prevent a sudden energy surge after the shedding period has ended, which can be caused by all the buildings serviced by the utility increasing their power demands simultaneously. During the recovery period, the thermostat set point is ramped up linearly over a given period of time. Again, the more severe the load shedding event, the longer will be the recovery period. To further minimize the impact of simultaneous startups, a random number of seconds are added to the time each thermostat begins to ramp back up so that only a certain number of buildings can begin ramping up at any one time.

Figure 2:
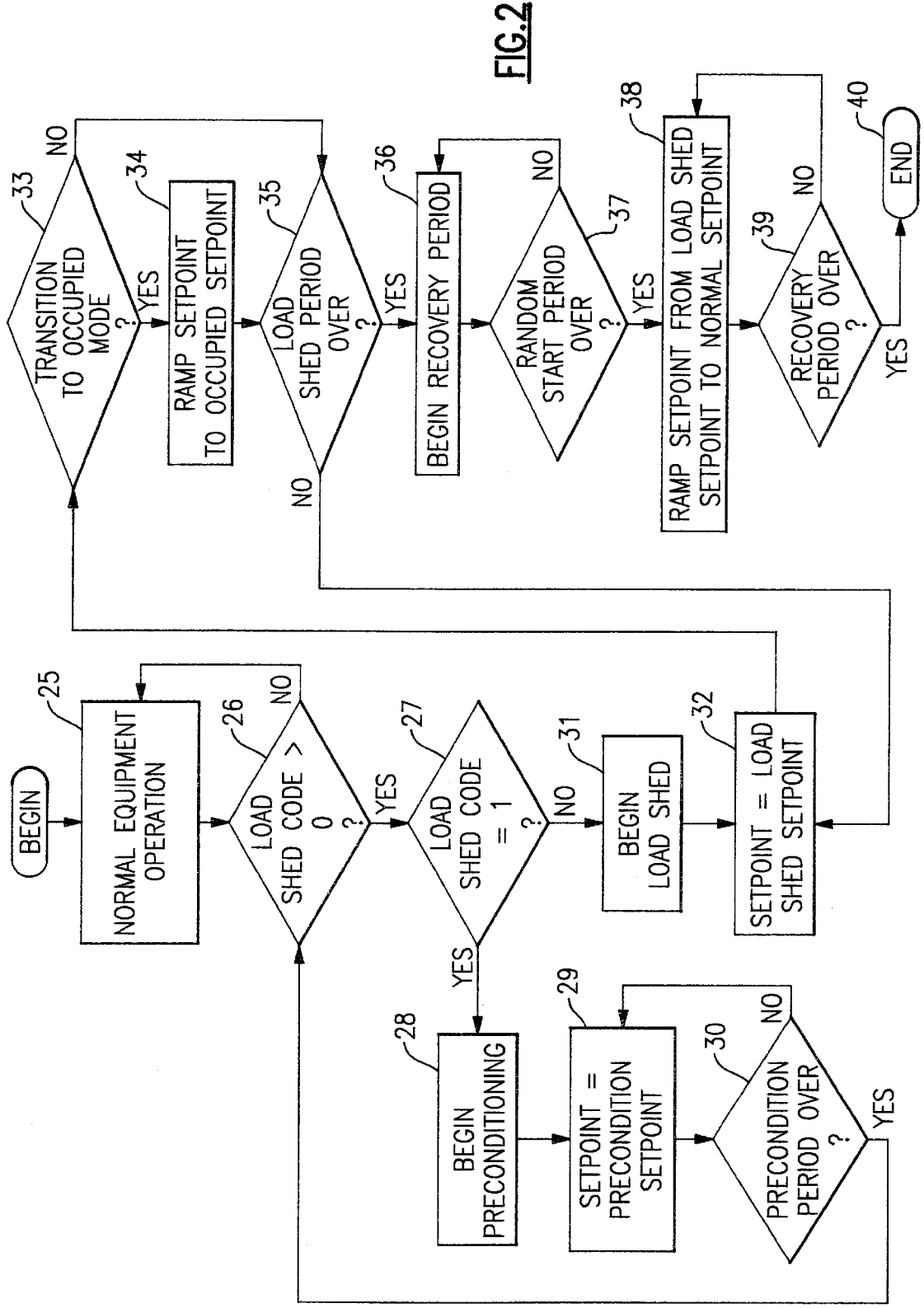
FIG. 2 is a flow diagram illustrating the operational steps carried out by the load shedding thermostat used in the home of FIG. 1 during a load shedding period.

Referring now to FIG. 2, there is illustrated an operational flow chart depicting the algorithm followed by the load shedding thermostat during a load shedding event. Under a Code 0 condition, normal equipment operations are carried out at step 25. In the event the code changes at step 26, the thermostat begins a load shedding sequence. If the code input is a Code 1, as indicated at step 27, the thermostat begins a preconditioning sequence at 28 wherein a preconditioning set point is selected to store energy within the building. When the preconditioned set point is satisfied at step 29, the preconditioned period is terminated at 30, and the program returns to step 26 to determine if a higher code input is being asked for by the utility. If so, a load shedding sequence is started at 31 and a new set point demanded by the selected input code is set into the thermostat at step 32.

If the thermostat has been placed in a building "unoccupied" setting during the normal equipment operation at step 25, there may be cases where the thermostat will automatically shift the unoccupied setting to an "occupied" setting at step 32. Changing the setting directly from the already energy reduction unoccupied setting to an occupied setting may actually cause the heating or cooling system to run continuously at full load increasing power consumption rather than reducing it. To avoid this occurrence, the set point is automatically ramped back at a given rate during the load shedding period at step 34 to a normal occupied setting.

The new load shedding set point relating to the code input signal is now maintained for the remainder of the load shedding period at step 35. When the load shedding period has expired, a recovery period is begun at 36. A random starting period for the recovery is set into thermostat at 37 so that all the buildings being serviced by the utility do not come on line at the same time. The set point is ramped from the load shedding setting back to the normal setting at step 38. The thermostat monitors the recovery at 39 and when the recovery is completed, the load shedding sequence is ended at 40.

As noted above, the heating and cooling loads on a building will vary depending upon the construction of the building and the type of heating and cooling system that is used to provide comfort air to the building. As noted above, the present thermostat is programmed to calculate the amount of setback that is required in order to achieve a desired percentage of load reduction to satisfy related code input signal. A two step process is followed in calculating the amount of setback needed in degrees to satisfy the code demand. First the cooling or heating load is determined during a normal operation period as a function of the indoor and outdoor temperatures. Secondly, the amount of setback required to achieve the desired percent in load reduction called for by the code number is calculated and set into the thermostat.

Determining a Heating or a Cooling Load During Normal Operation

Figure 3:
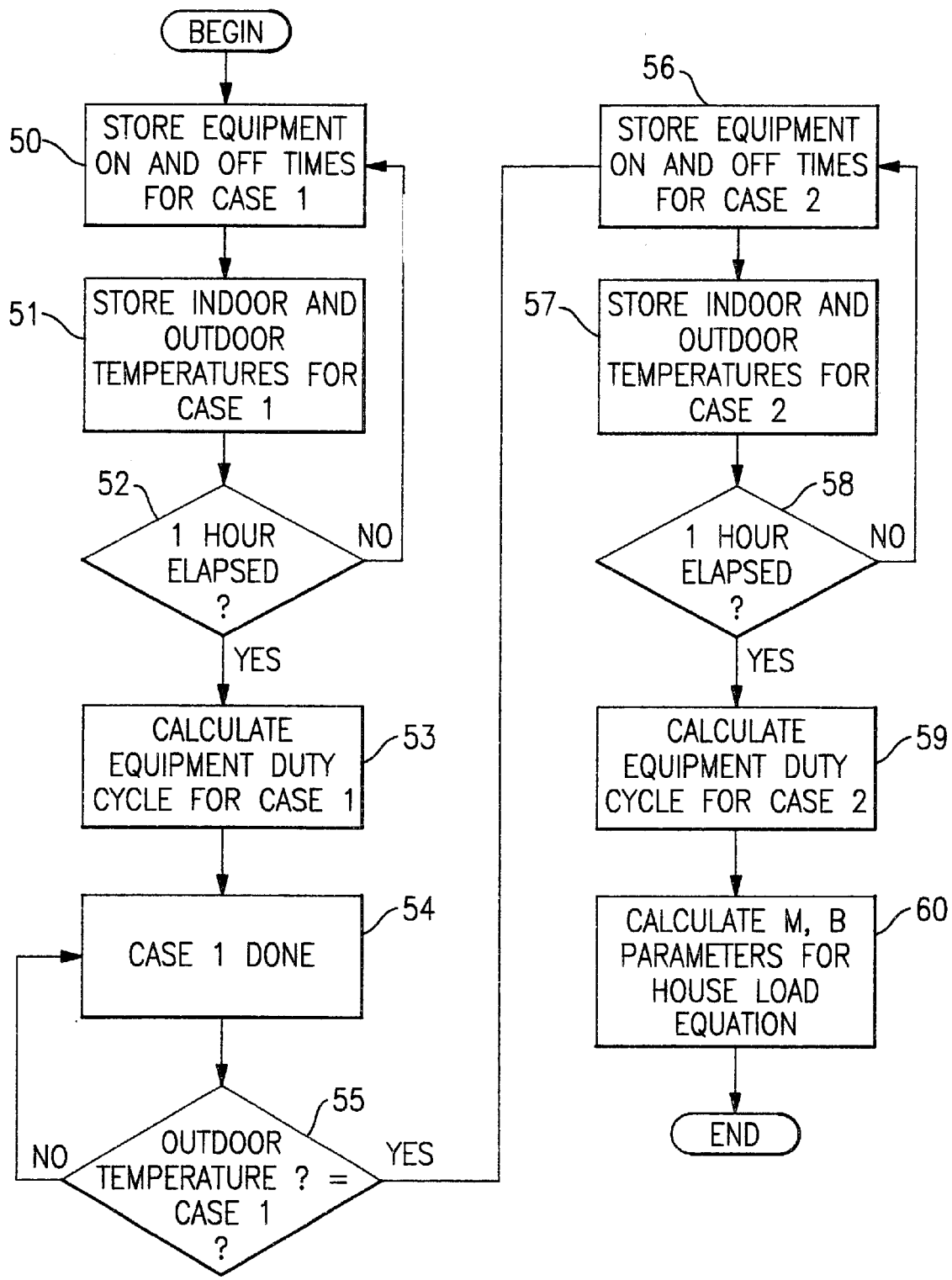
FIG. 3 is a flow diagram illustrating the programmed steps for calculating parameters relating to the home's heat loss and load characteristics.

The algorithm followed by thermostat processor in determining the energy load on a particular building being serviced by the utility is shown by the flow chart illustrated in FIGS. 3. As noted above, the thermostat monitors the activity of the heating and cooling equipment during normal operations and periodically updates the acquired data so that current information is available at the beginning of a load shedding sequence. The heating or cooling load on the building can be determined by the indoor and temperatures and factors relating to heat loss and load characteristics of the structure, wherein:

$$Q_L m(To-Ti)+b \qquad (1)$$

where:

$Q_L$ is the heating or cooling load on the building $T_o$ is the outdoor temperature $T_1$ is the indoor temperature, and m and b are parameters relating to the building's heat loss and load characteristics.

Figure 4:
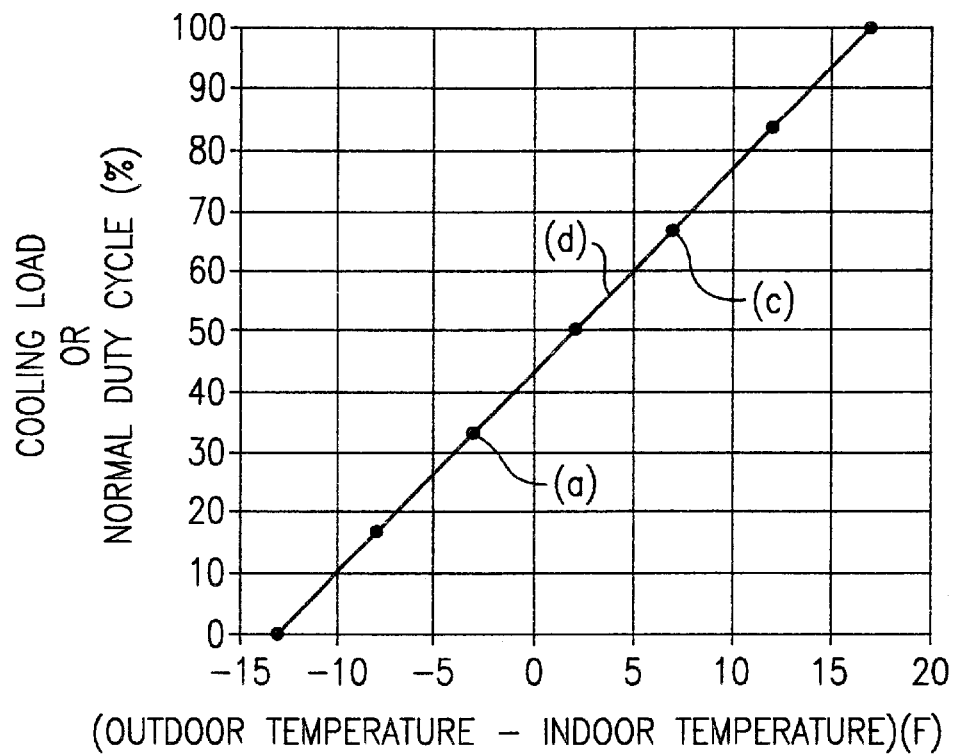
FIG. 4 is a graphic representation illustrating the relationship of outdoor and indoor temperatures to the normal heating or cooling system's duty cycle prior to a load shedding period.

FIG. 4 is a graphic representation by way of example illustrating a plot of the cooling load on a building as a function of outdoor and indoor temperature readings that are provided to the thermostat and the measured duty cycle during a given period of normal operation. The cooling load is normalized between 0% and 100% which is also representative of the equipment duty cycle during a given period of time. For a normal heating or cooling cycle, the amount of time the equipment is on during a given period of time is stored in the thermostat's memory along with the indoor and outdoor temperatures which is made available from any one of many well-known sources. From this information, a duty cycle can be determined and a first case state point (a) found on the graph. The process then is repeated for a second case involving different temperatures, and a second state point (c) is located on the graph. From the acquired data, a linear load line (d) is derived for the building. Using the data stored in the thermostat processor, the parameters b and m in equation (1) can be found by the following relationships:

$$m = \frac{DC_1 - DC_2}{(T_{01} - Ti_1) - (T_{02} - Ti_2)} \qquad (2)$$

$$b = DC_1 - m(T_{01} - T_{i1}) \qquad (3)$$

where:

m and b are parameters relating to the building heat loss and load characteristics $DC_1$ is duty cycle for the first case $DC_2$ is duty cycle for the second case $T_{o1}$ is the outdoor temperature for the first case $T_{o2}$ is the outdoor temperature for the second case $T_{i1}$ is the indoor temperature for the first case $T_{i2}$ is the indoor temperature for the second case Turning to FIG. 3, the flow chart outlines the algorithm followed by the thermostat in deriving parameters b and m. Initially, at step 50 the on and off equipment times are stored in the thermostat's memory over a first given period of time for a first case scenario (Case 1). Both the indoor and outdoor temperatures are also stored in memory at step 51 for the first given period of time. At the end of the first time period at 52, the duty cycle for Case 1 is calculated at 53. The Case 1 data acquisition is completed at 54 and a first state point (a) on load line (d) in FIG. 4 is identified.

When the outdoor temperature that is being monitored is unequal to that employed in Case 1, a second case scenario identical to that employed in Case 1 is begun at step 55. The steps carried out during the Case 2 scenario are depicted in the flow chart as steps 56–59. Case 2 now provides a second state point (c) on the graph illustrated in FIG. 4 so that the load line (d) for the building can now be derived. Using this load line information, both the b and m parameters for the building are found at step 60 according to relationships (2) and (3) noted above.

Determining the Amount of Setback for a Load Shed

Figure 5:
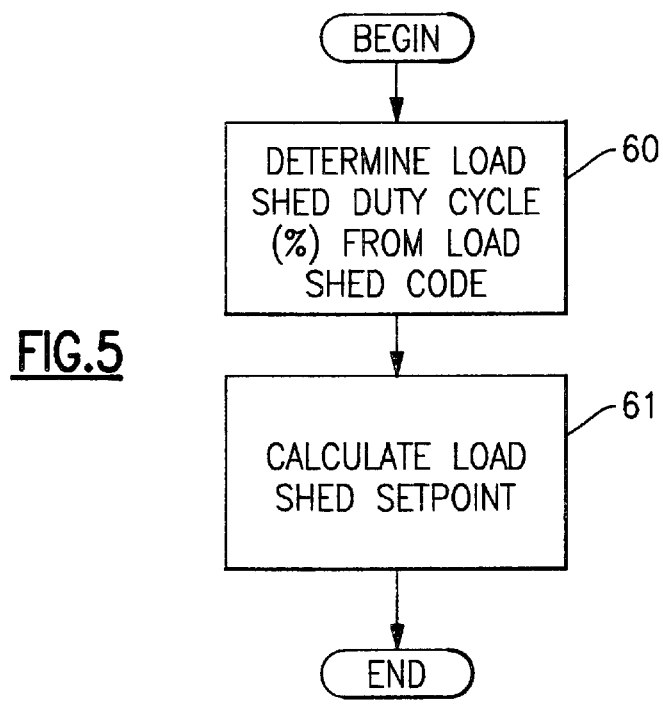
FIG. 5 is a flow diagram illustrating the steps in calculating the load shedding setback in relation to a code input signal.

The overall process for determining the set back during any load shedding period is illustrated by the flow chart in FIG. 5. As noted above, when a load shedding period begins, the utility sends a code input signal to the thermostat. The thermostat, using the previously stored and updated temperature and heat loss and load characteristic values, calculates the necessary setback temperature to achieve the desired percent energy saving. This is found by the relationship:

$$T_{id} = T_{0d} - \frac{Q_L - b}{m} \quad (4)$$

where the terms are as noted above in relation to equation (1). When a code input signal is received by the thermostat, the processor using the previously stored data relating to normal operations determines the load shedding duty cycle for the code input signal at 60. With this information the m and b factors are found as outlined above and the required load shedding set point is calculated at step 61.

TABLE 2

Load Shed Example

| | To (F) | Ti (F) | To-Ti (F) | Qload (%) | m | b | Qpred | Comments |
|---|---|---|---|---|---|---|---|---|
| Case 1 | 90 | 78 | 12 | 83 | 3.33 | 43.4 | 83 | Calculate m, b from 2 load cases |
| Case 2 | 83 | 76 | 7 | 67 | 3.33 | 43.4 | 67 | |
| Before | 94 | 77 | 17 | 100 | 3.33 | 43.4 | 93 | Just before load shed event |
| Load Shed | 94 | 79 | 15 | 93 | 3.33 | 434 | 93 | New indoor set point calculated to give 7% reduction in load |

A further example of how the load shedding method of th present invention is employed to change the thermostat set point during a period when the thermostat is calling for cooling is outlined in Table 2.

Figure 6:
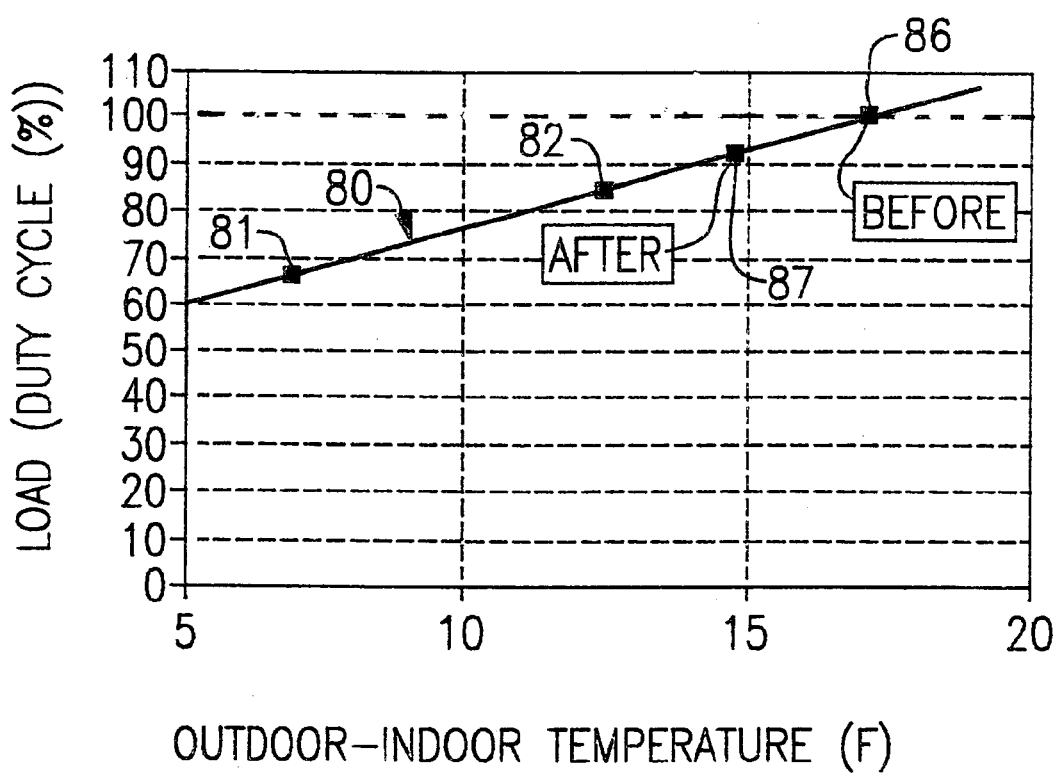
FIG. 6 is a graphic representation illustrating a load line generated from acquired data stored in the thermostat.

As depicted in Table 2, the thermostat has carried out a two case scenario at different temperatures to find the load and the b and m factors. Using equation (4) and the acquired and calculated data, a setback temperature for a Code 3 (see Table 1) input signal is found to be 79F, which will provide about a 7% reduction in energy consumption. FIG. 6 illustrates graphically the resulting load line 80 as a function of the measured indoor and outdoor temperature and the duty cycle percentages that were determined prior to the load shedding period. A pair of state points 81 and 82 are found for a two case normal operating scenario and the linear load line 80 is plotted that passes through both state points. For this example, it is assumed that the cooling system has been operating normally at one hundred percent prior to the initiation of the load shedding period. In order to achieve a reduction of 7% as called for by a code 3 condition, the indoor temperature must now be raised to 79 degrees. The reduction in energy consumption occurs along load line 80 between state point 86 and state point 87.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of load shedding that includes the steps of mounting a load shedding thermostat within a building, said thermostat being arranged to control heating and cooling equipment within the building and having an addressable processor for communicating with a power provider;

determining the normal operating load of the equipment prior to the initiation of a load shedding period by the relationship:

$$Q_L = m(T_o - T_i) + b$$

where $Q_L$ is the normal operating load on the building,

To is the measured outdoor temperature

Ti is the measured indoor temperature m and b are parameters relating to the building heat loss and load characteristics;

providing a code input signal to the processor to initiate a load shedding period during which the normal operating load is reduced by a given percentage;

determining the thermostat load shedding temperature setting required during the load shedding period needed to reduce the normal operating load by said given percentage; and placing the load shedding temperature into the thermostat.

2. The method of claim 1 wherein the setback temperature is determined by the relationship:

$$T_i = T_o - \frac{Q_L - b}{m}.$$

3. The method of claim 1 that includes the further steps of measuring the indoor and outdoor temperatures over a first given period and storing the temperature data for the first period in said processor;

measuring the duty cycle for the equipment during the first given period and storing the duty cycle data in said processor;

repeating the above noted measurement steps for a second period; and calculating the values of the m and b factors from the stored data.

4. The method of claim 3 wherein the m factor is determined by the relationship:

$$m = \frac{DC_1 - DC_2}{(T_{0i} - T_{i1}) - (T_{02} - T_{i2})}$$

and the b factor is determined by the relationship:

$$b = DC_1 - m(T_{01} - T_{i1})$$

where:

$DC_1$ is the measured duty cycle for the first given period $DC_2$ is the measured duty cycle for the second given period $T_{01}$ is the measured outdoor temperature for the first given period $T_{02}$ is the measured outdoor temperature for the second given period, $T_{i1}$ is the measured indoor temperature for the first given period $T_{i2}$ is the measured indoor temperature for the second given period.

5. The method of claim 1 that includes the further step of increasing the thermostat setting prior to a load shedding period to store additional energy within the building prior to load shedding.

6. The method of claim 1 that includes the further step of ramping the thermostat to an occupied setting in the event the thermostat is in an unoccupied setting at the initiation of a load shedding period, and automatically transitions to an occupied setting during a load shedding period.

7. The method of claim 1 that includes the further step of establishing a series of code input signals to the processor, each of which requires a different percentage reduction in the normal load condition at the time of a load shedding period.

8. A method of load shedding that includes the steps of
    mounting a load shedding thermostat within a building, said thermostat being arranged to control heating and cooling equipment within the building and having an addressable processor for communicating with a power provider;
    determining the normal operating load of the equipment prior to the initiation of a load shedding period;
    providing a code input signal to the processor to initiate a load shedding period during which the normal operating load is reduced by a given percentage;
    determining the thermostat load shedding temperature setting required during the load shedding period needed to reduce the normal operating load by said given percentage;
    placing the load shedding temperature into the thermostat;
    returning the thermostat setting back to the normal temperature setting upon termination of the load shedding period; and
    providing load shedding thermostats to a number of buildings serviced by the power provider and randomly returning said thermostats to their normal setting at different times.

9. The method of claim 8 that includes the further step of ramping the thermostat setting back to the normal setting in stages.

* * * * *